US007627191B2

(12) United States Patent
Xu et al.

(10) Patent No.: US 7,627,191 B2
(45) Date of Patent: Dec. 1, 2009

(54) IMAGE MANIPULATION

(75) Inventors: Beilei Xu, Penfield, NY (US); Robert P. Loce, Webster, NY (US); Yeqing Zhang, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 382 days.

(21) Appl. No.: 11/505,220

(22) Filed: Aug. 14, 2006

(65) Prior Publication Data

US 2008/0037899 A1    Feb. 14, 2008

(51) Int. Cl.
*G06K 9/40* (2006.01)
(52) U.S. Cl. .................... 382/254; 348/607; 358/3.1
(58) Field of Classification Search ............... 382/100, 382/254, 266, 267, 268, 269, 275, 276, 277, 382/296, 297, 298, 299; 348/606–624; 358/1.9–3.31, 358/447, 461, 463; 712/217; 345/611; 713/503
See application file for complete search history.

(56) References Cited

U.S. PATENT DOCUMENTS

| 5,001,766 | A | | 3/1991 | Baird |
| 5,187,753 | A | | 2/1993 | Bloomberg et al. |
| 5,208,871 | A | * | 5/1993 | Eschbach ............... 382/252 |
| 5,226,094 | A | * | 7/1993 | Eschbach ............... 382/252 |
| 5,355,420 | A | | 10/1994 | Bloomberg et al. |
| 5,553,171 | A | * | 9/1996 | Lin et al. ................ 382/299 |
| 5,855,433 | A | * | 1/1999 | Velho et al. ............. 382/162 |
| 6,301,397 | B1 | | 10/2001 | Jankowski et al. |
| 6,363,177 | B1 | | 3/2002 | Loce et al. |
| 6,449,396 | B1 | | 9/2002 | Loce et al. |
| 6,608,701 | B1 | | 8/2003 | Loce et al. |
| 6,636,649 | B1 | | 10/2003 | Murata et al. |
| 6,647,155 | B2 | | 11/2003 | Washio et al. |
| 6,690,482 | B1 | | 2/2004 | Toyoda et al. |
| 6,750,989 | B1 | | 6/2004 | Kamada et al. |
| 6,751,352 | B1 | * | 6/2004 | Baharav et al. ............. 382/183 |
| 6,985,640 | B2 | | 1/2006 | Schweid |
| 7,301,674 | B2 | * | 11/2007 | Feng et al. ................. 358/3.03 |
| 2003/0090729 | A1 | | 5/2003 | Loce et al. |
| 2003/0210431 | A1 | * | 11/2003 | Rylander ................... 358/3.06 |
| 2004/0085586 | A1 | * | 5/2004 | Feng et al. ................. 358/3.03 |
| 2004/0089727 | A1 | * | 5/2004 | Baharav et al. ............. 235/494 |
| 2006/0132847 | A1 | | 6/2006 | Xu et al. |
| 2006/0221358 | A1 | * | 10/2006 | Takahashi ................... 358/1.1 |

OTHER PUBLICATIONS

Geometric Operations—Affine Transformation webpage printout showing a brief description, 5 pages dated Aug. 14, 2006.
Digital Photography Review webpage printout showing interpolation, 3 pages dated Aug. 14, 2006.

* cited by examiner

*Primary Examiner*—Anand Bhatnagar
(74) *Attorney, Agent, or Firm*—Fay Sharpe LLP

(57) ABSTRACT

Image data is scaled, rotated and/or otherwise manipulated. Diffusive effects of associated interpolation and/or re-sampling are compensated for, or corrected, by applying an adaptive packing form of error diffusion to output data of one or more manipulating transforms. For example, rank order error diffusion is applied to output data of a manipulating transform, thereby restoring compaction to otherwise diffuse halftone structures (e.g., halftone dots, lines, etc), saturated text and/or other small, high contrast image elements.

17 Claims, 4 Drawing Sheets

IMAGE MANIPULATION

BACKGROUND

The presently disclosed embodiments are directed toward systems and methods for image manipulation. For example, images that include small, high-contrast image elements are scaled and/or rotated in a manner that preserves the small, high-contrast image elements and minimizes the production of undesirable image manipulation artifacts.

It is often desirable to manipulate an image or data representing an image. For example, images are resized and/or reoriented to suit a particular purpose. For instance, slides from a business presentation may be reduced in size so that a reference printout including several slides per individual page can be produced. Photographs or portions of photographs may be enlarged or reduced in size to be included in a booklet, catalog or brochure. Images that were originally intended to be rendered in a first orientation, such as, for example, landscape, may be rotated in order to be rendered in a portrait orientation. Image data from documents that were hastily placed on a platen and scanned may be processed to rotate or deskew the scanned image to compensate for an improper alignment of the document on the platen.

In many instances, known image data manipulation techniques produce high-quality manipulated image data that can be used to render visually pleasing images. For example, when image data represents pictorial or business graphic data depicting relatively large and/or gradually changing image objects, known image manipulation techniques typically provide manipulated image data that can be rendered in a visually pleasing manner.

However, we have determined that for at least some image types or classes, known image manipulation techniques can produce manipulated image data that includes displeasing image manipulation artifacts. For example, where image data includes small, high-contrast image elements, such as halftone structures (e.g., dots, lines, etc.) or text, known image manipulation techniques can produce image data that results in rendered images that appear noisy and may be printed differently over time as conditions (e.g., temperature, humidity, wear, etc.) change.

Therefore, there has been a desire for improved or alternative image manipulation methods and systems for manipulating image data that includes small, high-contrast image elements.

BRIEF DESCRIPTION

A method for manipulating image data that includes small, high contrast image elements can include receiving the image data, applying an image manipulating transform to the image data, thereby generating transformation output data, and applying an adaptive packing form of error diffusion to the transform output data, thereby restoring compaction of the small, high contrast image elements that may have been lost due to the application of the image manipulating transform and generating manipulated image output data.

For example, applying an adaptive packing form of error diffusion can include applying a form of rank order error diffusion, thereby providing compaction of image elements that may have become diffuse or fragmented as a result of the application of the image manipulation transform.

Accordingly, an image processor can include an image data receiver, an image transformer and an adaptive packing rendering module. For instance the image data receiver can be operative to receive image data that includes small high contrast image elements. The image transformer can be operative to receive the image data that includes small high contrast image elements from the image data receiver and apply an image manipulating transform to the image data, thereby generating transformation output data. The adaptive packing rendering module can be operative to apply an adaptive packing form of error diffusion to the transform output data, thereby restoring compaction of the small high contrast image elements that may have been degraded due to the application of the image manipulating transform and generating manipulated image output data.

DETAILED DESCRIPTION

Figure 1:
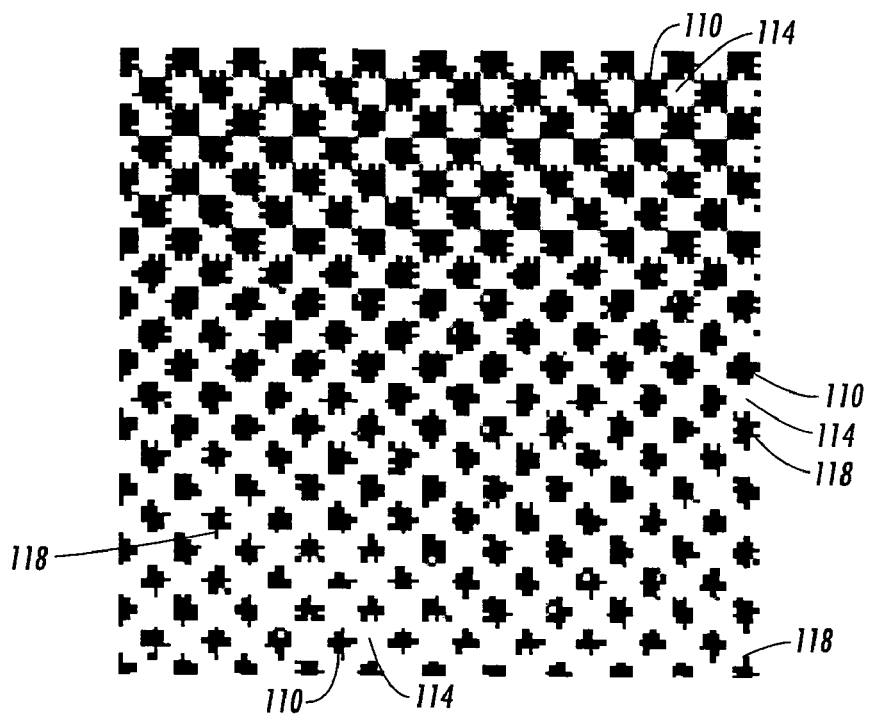
FIG. 1 provides an enlarged view of a small portion of a halftoned image, which was scaled up and rendered according to prior art image data manipulation techniques.
Figure 2:
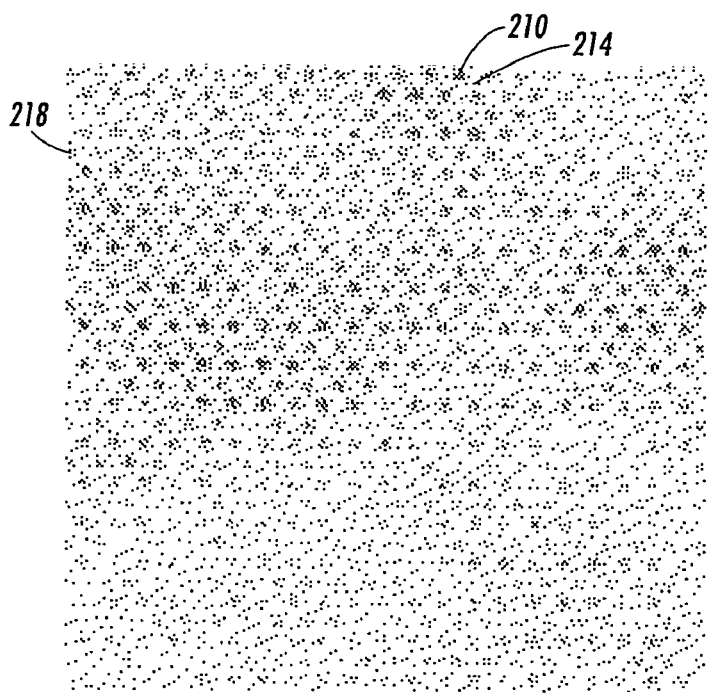
FIG. 2 provides an enlarged view of a small portion of a halftoned image which was rotated and rendered according to prior art image manipulation techniques.
Figure 3:
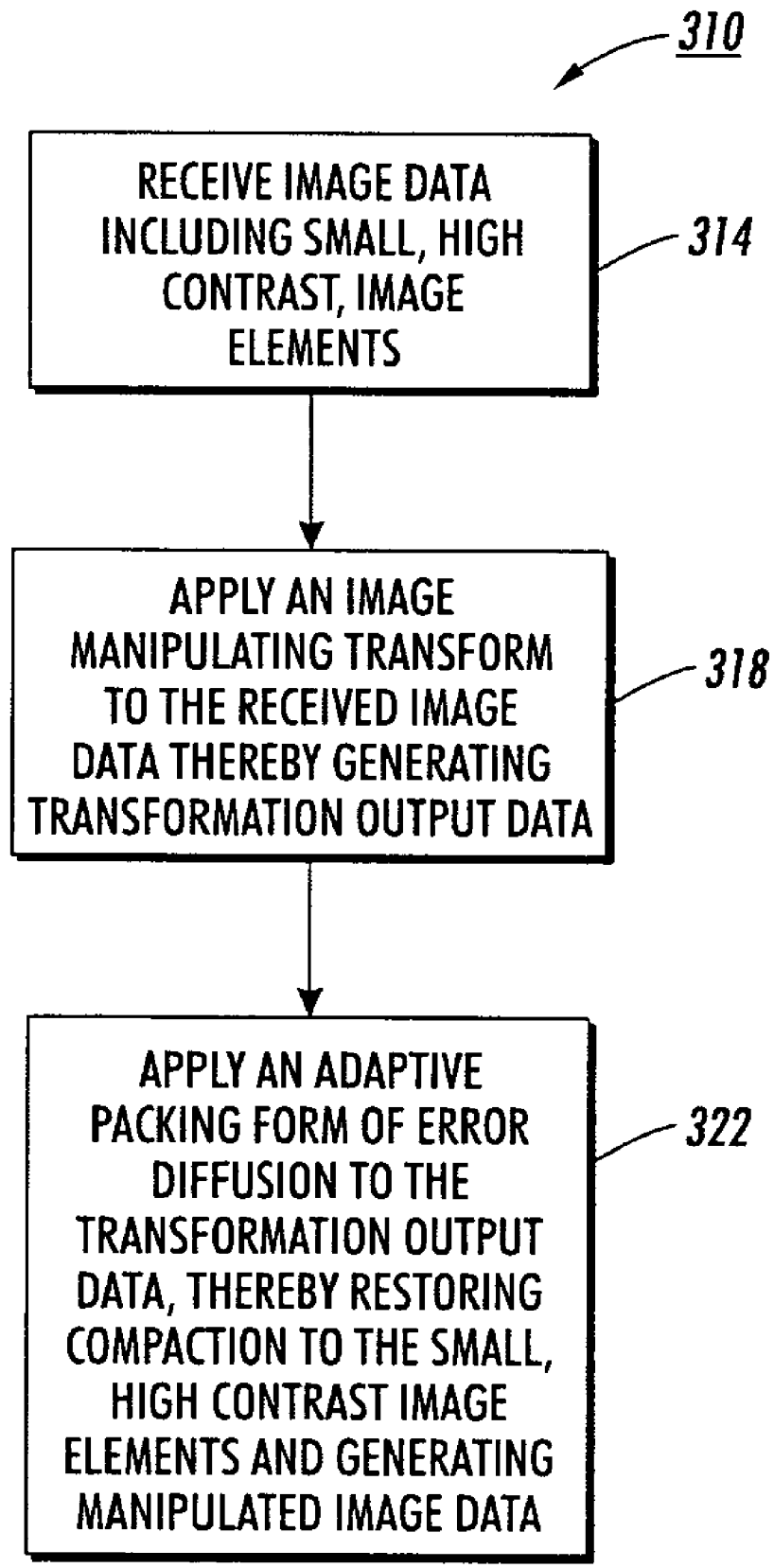
FIG. 3 is a flow chart outlining a method for manipulating image data.

Referring to FIG. 1 and FIG. 2, a study of prior art image data manipulation techniques revealed that when image data includes small, high-contrast image elements, such as, for example, halftone structures, such as halftone dots 110, directly adjacent to unmarked areas (e.g., 114, 214) or white space, prior art image manipulation techniques can produce images that appear noisy and include elements that effect printed image stability or consistency over time.

For example, many image manipulation techniques involve a mapping of pixels in an input image to pixels in an output image. However, pixel positions in the output image often do not exactly coincide with pixel positions in the input image. For example, when scaling an image according to standard scaling factors, such as, for example, 64 percent, 70 percent, 129 percent and 141 percent, used to scale 11×17, A3, 8.5×11, and A4 original images for rendering on 8.5×11, A4, 11×17 and A3 sized paper, respectively, output image pixel positions do not exactly coincide with input image pixel positions. Similar issues arise when image data is manipulated to produce a rotated or deskewed image. Accordingly, image manipulation techniques include resampling or interpolation of or between input image data or pixel values in order to determine or estimate appropriate pixel values at the pixel positions of the output image. Consequently, even when input image data includes only high-contrast image elements, such as, for example, halftone structures (e.g., lines, dots) or black or saturated text on a white or completely unmarked background (e.g., saturated pixel values, such as 255 directly adjacent to pixels with a value of 0), the resampling and/or interpolation generates intermediate or grey contone values for some pixels or pixel positions in the output or manipulated image data.

When such grey values are processed for rendering according to prior art image manipulation techniques, such as, for example, by rehalftoning or by processing according to conventional error diffusion methods, image elements in the output or manipulated image data, which are related to the small, high-contrast image elements in the input image data, can be rendered to include fingers, hairs or projections 118 or as stochastic or fragmentary dots 210 or loosely clustered sets of spots 218. These artifacts (e.g., 118, 210, 218) of image manipulation and rendering can be perceived as a visually displeasing noisiness or graininess. Additionally, or alternatively, the perceptibility of even slight dot gain variations in the performance of a printer, print engine or other rendering device is increased when an image includes very small structures, such as these (e.g., 118, 218) image manipulation and rendering artifacts. Therefore, there has been desire for methods and systems for manipulating image data that produce fewer of such (118, 218) image manipulation artifacts).

A method 310 for manipulating image data that includes small, high-contrast image elements can include receiving 314 the image data that includes small, high-contrast image elements, applying 318 an image manipulating transform to the received image data, thereby generating transformation output data, and applying 322 an adaptive packing form of error diffusion to the output data, thereby restoring compaction of the small, high-contrast image elements that may have been lost due to the application of the image manipulating transform and generating manipulated image output data.

Image data may be received 314 by any means. For example, image data may be received as output from an image or document authoring tool such as a word processor, desktop publisher, slide presentation, spreadsheet or other document or image creation software. Additionally, or alternatively, image data may be received through an imaging process, such as, for example, scanning or digitally photographing a scene or a printed, painted, drawn or photographically created image or document. While the method 310 can be applied to any image data, it is most beneficially applied to image data that includes small, high-contrast image elements, such as, for example, text and/or halftoned images which include halftone structures, such as isolated dots, lines and other halftone structures which have at least one dimension (e.g., diameter, width, height, etc.) that is small (e.g., 3 pixels).

Applying 318 an image-manipulating transform can include applying any image-manipulating transformation. However, the method 310 is most beneficially applied where the transform includes resampling or interpolation of or between image data or pixel values and/or which may create, estimate or generate grey or intermediate contone values at pixel locations adjacent to pixels associated with small, high-contrast image elements in transform output image data.

For example, affine transformations are available for rotating, deskewing, resealing, resizing images or image data and/or for up or down converting sampling resolutions thereof.

In matrix notation, the general form of an affine transform can be expressed as:

$$\begin{vmatrix} x_2 \\ y_2 \end{vmatrix} = A \times \begin{vmatrix} x_1 \\ y_1 \end{vmatrix} + B \qquad \text{Eq. 1}$$

where $x_2, y_2$ are coordinates of pixels in the output image and $x_1, y_1$ are coordinates of pixel locations in the input image and A and B are transformation matrices.

When the matrices are defined as illustrated in Equation 2, the affine transform of Equation 1 can be used to move or translate an image with respect to a reference point.

$$A = \begin{vmatrix} 1 & 0 \\ 0 & 1 \end{vmatrix}, \quad B = \begin{vmatrix} b_1 \\ b_2 \end{vmatrix} \qquad \text{Eq. 2}$$

Defining the matrices as depicted in Equation 3, wherein $\theta$ is the angle of desired rotation provides a rotational or deskewing transformation.

$$A = \begin{vmatrix} \cos(\theta) & -\sin(\theta) \\ \sin(\theta) & \cos(\theta) \end{vmatrix}, \quad B = \begin{vmatrix} 0 \\ 0 \end{vmatrix} \qquad \text{Eq. 3}$$

When the matrices are defined as depicted in Equation 4, the affine transform of Equation 1 can be used to scale (i.e., magnify or reduce) the image represented by the input image data, where $a_{11}$ and $a_{22}$ are the scale factors for the x and y coordinates, respectively.

$$A = \begin{vmatrix} a_{11} & 0 \\ 0 & a_{22} \end{vmatrix}, \quad B = \begin{vmatrix} 0 \\ 0 \end{vmatrix} \qquad \text{Eq. 4}$$

In each of these kinds of transformations, and/or in combinations of these transformations, it is likely that, even where the input image data (e.g., $x_1, y_1$) is limited to high-contrast image data (saturated or pure black image elements adjacent to completely unsaturated or pure white image elements), estimated pixel values for some of the output image pixel locations (e.g., $x_2, y_2$) will yield intermediate or grey contone values. As explained above, these grey values can lead to the rendering of protrusions 118 and/or isolated spots 218. However, applying 322 an adaptive form of error diffusion to the transformation output data, as part of the rendering process, can restore image element compactness by concentrating darkness adjacent to dark pixels and concentrating lightness adjacent to light pixels.

For example, an unconventional form of error diffusion referred to as rank order error diffusion can be used to concentrate image darkness in clusters of dark pixels and to concentrate image lightness in clusters of light pixels.

In the conventional forms of error diffusion used to generate binary representations of images (variations related to high-addressability pixels will be discussed below), a contone pixel value (e.g., typically ranging from 0 to 255 in 8-bit systems) is compared to some threshold in order to make a marking decision. For instance, the threshold can be the same for every pixel in an image or the threshold can vary, for example, according to a halftone screen. If the pixel value is above the threshold, a first marking decision is made. If the pixel value is below the threshold, the alternative marking decision is made. For example, if the pixel value is above the threshold, the decision to place a mark is made. If the pixel value is below the threshold, a decision not to place a mark and to leave the print media blank (e.g., white). These marking decisions are associated with contone values. For example, placing a mark is associated with the contone value of 255. Not placing a mark is associated with a contone value of zero. Therefore, the decision to place a mark or not place a mark is associated with a lightness or darkness error. For example, if the threshold value is 130 and a pixel value of a target pixel is 150, a decision may be made to place a mark. However, placing a mark at the point in the image corresponding to the target pixel position makes that portion of the image darker than is called for by the pixel value of the target pixel. Placing a mark is associated with a contone value of 255, whereas target pixel value only calls for a darkness associated with the contone value 150. Accordingly, that portion of the image associated with the target pixel is considered to be 105 contone value counts too dark. Conventional forms of error diffusion address this issue by a lightening (e.g., subtracting contone counts from) the pixel values of pixels neighboring the target pixel. Where the sense of the error is in the opposite direction (i.e., where a decision not to mark causes the portion of the image to be lighter than called for by the value of the target pixel), darkness is added (or lightness is subtracted) to (from) the values of one or more neighboring pixels.

For example, a selected diffusion mask identifies pixels neighboring the target pixel for receiving a distribution of error associated with the marking decision made regarding the target pixel. For instance, a pixels immediately to the right of the target pixel may receive 50 percent of the error, while pixel further away and/or below the target pixel receive other percentages of the error based on their position relative to the target pixel.

This means that a marking decision made relative to a grey or intermediate contone valued pixel generated as a result of the resampling or interpolation of the application 318 of an image manipulation transform can cause other greyed pixels to be revalued to the other side of the marking decision threshold. For instance, where interpolation associated with a transformation 318 has generated an estimated pixel value of a first pixel immediately adjacent a dark cluster of pixels of a halftone dot to be a grey value of 125, and a second pixel neighboring the first pixel and further from the halftone dot to have a value of 71, conventional error diffusion can generate a marking decision to make the first pixel unmarked and the second neighboring pixel marked. That is, since the first neighboring pixel has a value of 125, which is below the threshold of 130, the decision is made to leave the portion of the image associated with the first neighboring pixel unmarked. However, this generates an error. The area associated with the first neighboring pixel is now 125 counts too light. Therefore, darkness is added to the neighboring pixels. For example, 50 percent of the error, or 63 counts, may be added to the value of the second neighboring pixel raising its value to 132. Therefore, when the second neighboring pixel becomes the target pixel of the conventional error diffusion process, the marking decision will be to mark the area associated with the second neighboring pixel. In this way, the fingers, hairs and isolated spots (118, 218) of FIGS. 1 and 2 are generated.

In contrast, applying 322 an adaptive packing form of error diffusion concentrates darkness in the darkest available pixels and concentrates lightness in the lightest available pixels and reduces or prevents the formation of the fingers, hairs and isolated spots (e.g., 118, 218) depicted in FIGS. 1 and 2.

For example, in rank ordered error diffusion, neighboring pixels within a selected diffusion mask or window of pixels neighboring the target pixel are ranked according to the darkness or lightness represented by their respective pixel values. Error associated with a marking decision made regarding a target pixel is then distributed according to that ranking. Instead of distributing 50 percent of the error to the first neighboring pixel as described in the example discussed above, simply because of the position of the first neighboring pixel relative to the target pixel, darkness is added first to the darkest pixels within the window and/or lightness is distributed to the lightest pixels within the window.

Therefore, when applying 318 an image manipulating transform generates estimated pixel values which follow a gradient according to, for example, linear, bilinear, bicubic or other form of interpolation, using rank order error diffusion to make marking decisions and distribute error tends to provide for pixels estimated to have the darkest value to be associated with decisions to place a mark and for pixel positions associated with the lightest pixel value estimations will tend to be associated with decisions not to place a mark.

Figure 4:
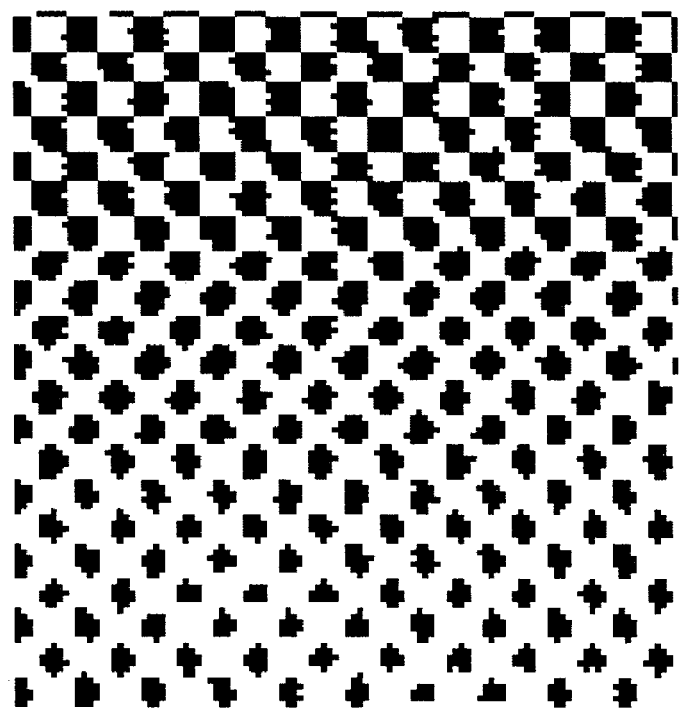
FIG. 4 provides an enlarged view of a small portion of a halftoned image, which was scaled up and rendered according to an embodiment of the method of FIG. 3.
Figure 5:
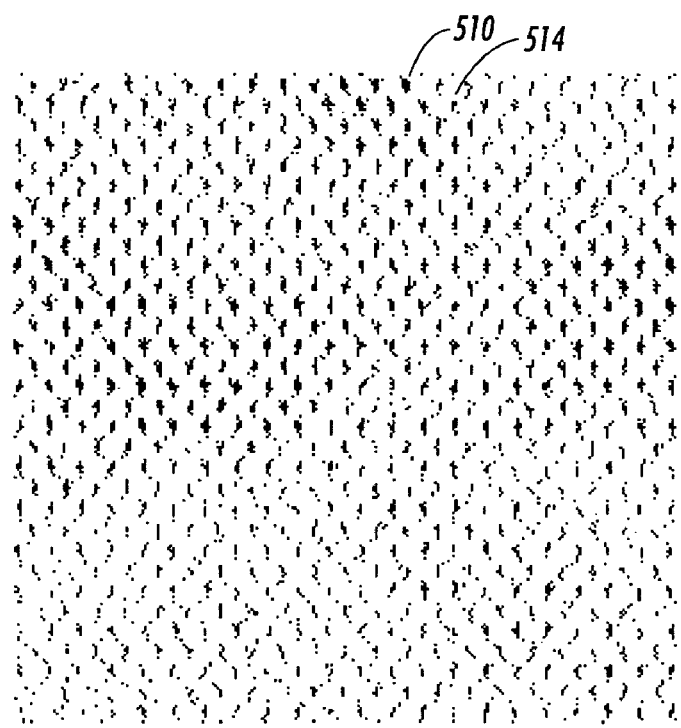
FIG. 5 provides an enlarged view of a small portion of an image, which was rotated and rendered according to an embodiment of the method of FIG. 3.
Figure 6:
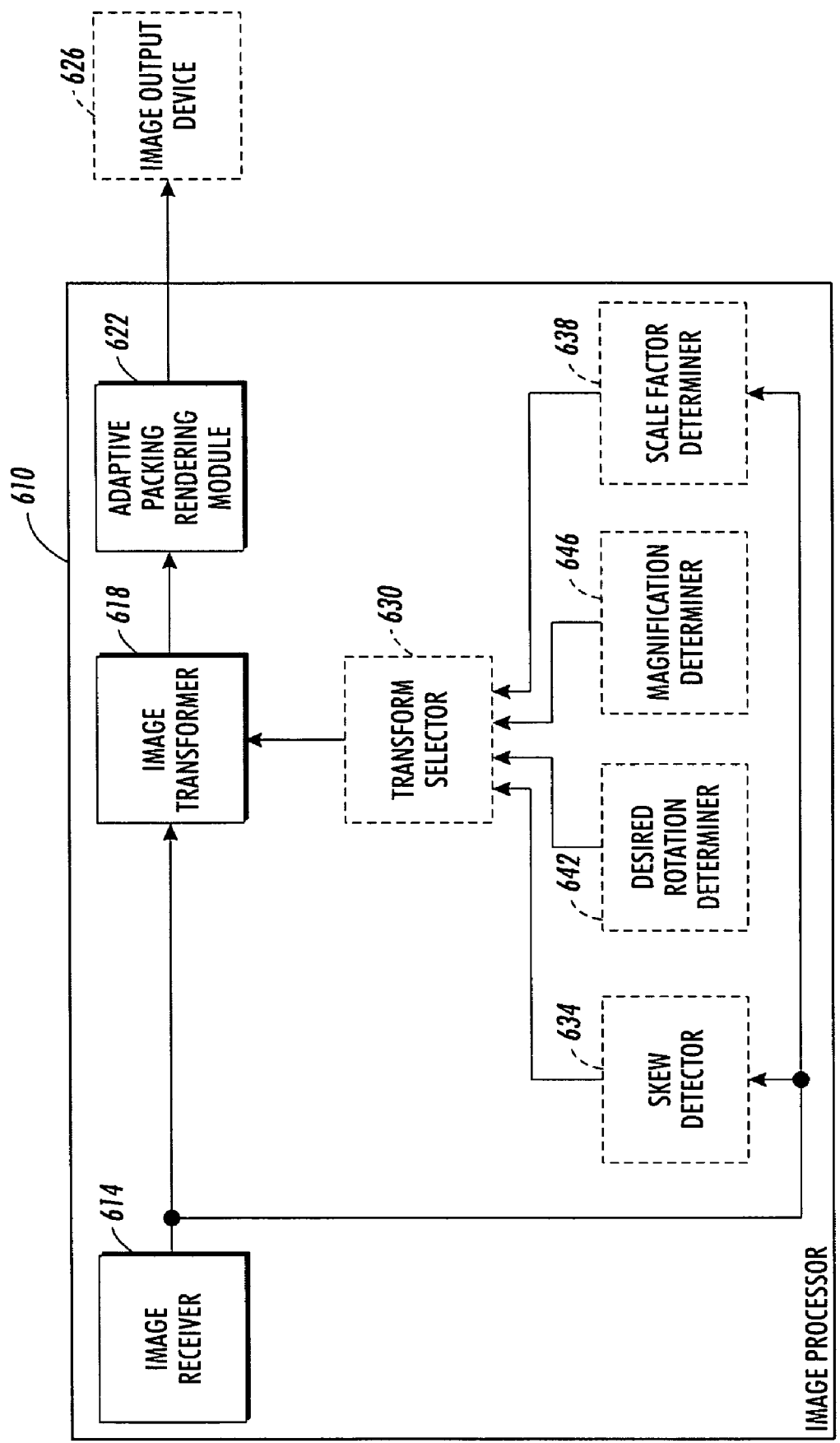
FIG. 6 is a block diagram illustrating embodiments of a image processor that is operative to perform embodiments of the method of FIG. 3.

This tends to improve the compactness of halftone structures and other small, high-contrast image elements and reduce or eliminate the production or generation of problematic fingers, hairs and isolated spots (e.g., 118, 218). For example, FIG. 4 is an enlarged view of a portion of an image that was scaled up by an embodiment of the method 310 for manipulating image data. Accordingly, an adaptive packing form of error diffusion (i.e., rank order error diffusion) was applied 322 to the transform 318 output data. As a result, far fewer finger, protrusion or hair artifacts are visible in the view of FIG. 4 than are visible in the view of FIG. 1. FIG. 5 is an enlarged view of a portion of an image that was rotated or deskewed according to an embodiment of the method 310 for manipulating image data. Accordingly, the halftone structures therein (e.g., 510) are more compact than the halftone structures (e.g., 210) of the enlarged image portion that was rotated according to prior art methods depicted in FIG. 2. Additionally, white or unmarked areas 514 are relatively free of isolated spots (e.g., 218).

Adaptive packing forms of error diffusion (e.g., ROED) may also be applied to render high-addressable pixels. However, instead of thresholding to one of two binary states (mark or unmark, 1 or 0, 255 or 0), additional thresholds are used to make sub-pixel or pixel event marking decisions.

High-addressability or high-addressable pixels may be used where, for example, a print engine or rendering device can be controlled with more precision than is called for by the printing resolution. For example, in some xerographic print engines, a position of a laser spot can be controlled with greater precision than is required to produce marks at the standard resolution of the printer (e.g., 600 spots per inch). For instance, while a diameter of a laser beam spot may be on the order of 0.00167 inches (corresponding to a 600 spots per inch resolution specification), it may be possible to possible to position that laser with a precision on the order of 0.0008, 0.0004 or 0.0002 inches. Accordingly, with such rendering devices, it is possible to mark or address a pixel at sub-pixel or high-addressable pixel event resolutions. For instance, a portion of an image represented by a pixel may be addressed as 2, 4, 8 or more sub-pixels or high-addressable events.

In such circumstances, it may be beneficial to apply 322 an adaptive packing form of error diffusion that quantizes transform (e.g., 318) output image data to more than the two binary states. For example, where a high-addressable pixel includes 4 high-addressable events, 4 quantization thresholds may be used to determine if submarks are to be applied to 0, 1, 2, 3 or 4 of the high-addressable events. The availability of high addressability reduces the magnitude of the errors to be distributed to neighboring pixels. However, the process for ranking neighboring pixels and distributing error associated with marking decisions made relative to the target pixel are the same as described above.

Rank order error diffusion may be implemented in many different ways. For example, all the error associated with a marking decision may be transferred to a single neighboring pixel (i.e., the darkest or lightest pixel within a selected diffusion window). Alternatively, all or some of the pixels within the window may be assigned a weight or percentage based on their rank and receive error from the marking decision associated with the target pixel according to their assigned weight. In yet another embodiment, error is distributed to neighboring pixels within the distribution window according to their rank until each pixel is at a saturation value (e.g., 255, 0) or until all the error is distributed, whichever occurs first. In other embodiments, ranking is a function of both pixel value and pixel position. For example, weights or offsets are assigned to pixels based on their position within the diffusion mask or window whereby pixels closer to the target pixel may tend to be ranked higher (or lower) than pixels further from the target pixel. That is, for the purposes of ranking, an offset bias or amplifying coefficient may be applied to the actual pixel value to implement a position-based preference for the distribution of error. Furthermore, various combinations of these and other variations can be used in applying 322 an adaptive packing form of error diffusion.

An illustrative image processor 610 that is operative to implement embodiments of the method 310 for manipulating image data includes an image receiver 614, an image transformer 618 and an adaptive packing rendering module 622.

The image data receiver 614 may be operative to receive 314 image data that includes small, high-contrast image elements. For instance, the image receiver 614 is operative to receive 314 halftoned images and/or images with text elements. The image receiver 614 can receive images by any means of data communication. For example, images can be transferred to the image receiver 614 via a computer network, telecommunications network, computer medium, such as, for example, magnetic disk, optical disk, magnetic tape or solid state memory device. Additionally, if the image processor includes authoring tools, the image receiver 614 may receive image data directly from the authoring tools or computer memory associated therewith. For example, the image data receiver 614 may receive images from a word processor, slide presentation tool, desktop publishing software, or a scan and make ready tool. Furthermore, the image data receiver 614 may receive image data from a scanner or digital camera that is used to image or digitize an image of an item or document of interest.

The image transformer 618 may be operative to receive the image data from the image data receiver 614 and apply 318 an image manipulating transform to the image data, thereby generating transformation output data. For instance, the image transformer 618 may apply 318 an affine or other type of image manipulation transform to the image data received from the image data receiver 614. For example, the transformation may translate, rotate, deskew, magnify or reduce in size the image represented by the image data received from the image data receiver 614.

The adaptive packing rendering module 622 may be operative to apply an adaptive packing form of error diffusion to the transform output data, thereby restoring compaction of the small contrast image elements that may have been degraded due to the application 318 of the image manipulating transform and generating manipulated image output data. For example, the generated manipulated image output data may be delivered to an image output device 626. The image output device 626 may be a printer or print engine, facsimile transmission machine, display device or other device for providing visual representations of images. Alternatively, the manipulated image output data may be stored in a computer memory or computer media or transmitted to another device over a communications or computer network.

For instance, the adaptive packing rendering module 622 may process transform output data from the image transformer 618 according to a rank order error diffusion algorithm as described above.

The image processor 610 may also include a transform selector 630. For example, the transform selector may be operative to select an image manipulating transform for use by the image transformer 618. The selection can be based on a detected aspect of the received image data, a known aspect of a selected output device or a manipulation requested by a user of the image processor 610.

For instance, the image processor 610 may also include a skew detector 634 and/or a scale factor determiner 638. The skew detector 634 may analyze image data received from the image receiver 614 and determine that the image includes a skew that may have been unintentional and is undesirable. The skew detector may automatically determine a skew angle associated with the received image data. The skew detector 634 may report the presence of skew and the skew angle to the transform selector 630. In some embodiments, the skew detector 634 may communicate with an image processor operator or user to report the presence of a detected skew and to ask the user if the user wishes to remove the skew. If the user does wish to remove the skew, the skew detector 634 then reports the presence of skew and the desired correction angle to the transform selector 630. Alternatively, or additionally, the scale factor determiner 638 may determine a size and/or resolution of an image represented by image data received from the image receiver 614. The scale factor determiner 638 may then compare some or all of these parameters to the capabilities of a selected image output device 626. If for example, the image data received from the image receiver 614 is at a higher resolution than can be achieved by the image output device 626, or if the image data received from the image receiver 614 represents a larger image than can be displayed, printed or rendered by the image output device 626, the scale factor determiner 638 may determine a scale factor for reducing the resolution or size associated with a renderable version of the image data and report the desirability of rescaling and a scaling factor to the transform selector 630. In some embodiments, the scale factor determiner 638 may report the issues related to resolution and/or image size to an image processor operator or user and request input from the user with regard to appropriate actions. If the user indicates that scaling is appropriate, the scale factor determiner 638 reports the desirability of scaling and a determined or selected scaling factor to the transform selector 630.

In some applications, it may be desirable to allow an image processor operator or user to manipulate image data at will. For example, an image processor user may want to rotate an image in order to render it in a landscape orientation or portrait orientation even though the image data was authored in the alternative orientation. Alternatively, the image processor user may want to rotate an image according to some acute or obtuse angle for artistic reasons or to enhance or obscure the legibility of information included in the image. Additionally, or alternatively, an image processor user may want to adjust the scale of an image for artistic reasons, reasons of conservation and/or to enhance or reduce the legibility of the image data or portions thereof.

Accordingly, some embodiments may include a desired rotation determiner 642 and/or a magnification determiner 646. For example, each of these elements 642, 646 may communicate with an image processor user to determine desires of the user with regard to image data manipulation of the image data received by the image receiver 614. In some embodiments, the elements 642, 646 provide a simple interface for entry of a desired rotation angle and/or a desired magnification. These may be numeric entries or selections or may be communicated through designations such as landscape to portrait, 8½×11 to A4, or 2-up or 4-up (≈0.5x, ≈0.25x) indicating a desire to combine images from 2 or 4 pages onto a single page of a document. Alternatively, more sophisticated manipulation tools may be provided. For instance, a representation of the image data may be displayed in its original form and/or views of the image data may be presented according to emulations of trial manipulation parameters. For instance, the user may designate preliminary rotation or scaling parameters and see a representation of the results of those parameters. When the user is satisfied with the emulated results, an entry indicating approval is provided and the rotation determiner 642 and/or magnification determiner 646 reports the final selections to the transform selector 630.

Accordingly, the transform selector 630, based on the received information from one or more detector or determiner (634, 638, 642, 646) may select one or more appropriate transformation and/or transformation parameters and deliver them to the image transformer 618. For example, the transform selector 630 may designate values for the matrices of the affine transforms discussed above (e.g., Equations 1-4) and/or indicate that a plurality of transformations are to be performed in a particular sequence.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments implemented in hardware, software or a combination thereof. The description of the image processor 610 includes a description of elements (e.g., 614, 618, 622, 630, 634, 638, 642, 646) arranged for clarity of explanation. The various described functions can be provided in other system organizations and arrangements and by different designations while still providing the described functionality. Although the term grey scale or level has been used throughout the description, the method and systems are not limited to monochrome or black and white embodiments. It is understood that the methods and systems described above are equally applicable to color images described in terms of multi-dimensional color spaces including, but not limited to, device-independent color spaces, such as L*a*b* and device-dependent color spaces, such as those designated by values in terms of cyan, magenta, yellow and black colorants.

The invention claimed is:

1. A method for transforming image data that includes small, high contrast image elements, the method comprising:
   receiving the image data that includes small, high contrast image elements including at least one of: halftone image structure and text;
   applying an image manipulating transform to the image data, thereby generating transformation output data; and
   applying an adaptive packing form of rank order error diffusion to the transform output data, thereby restoring compaction of the small, high contrast image elements that may have been lost due to the application of the image manipulating transform and generating manipulated image output data.

2. The method of claim 1 wherein receiving the image data that includes small high contrast image data comprises:
   receiving image data including high addressability image data.

3. The method of claim 1 wherein applying the image manipulating transform comprises:
   applying an affine transform to the image data.

4. The method of claim 3 wherein applying the affine transform comprises:
   applying a rotational affine transform.

5. The method of claim 4 wherein applying the rotational affine transform comprises:
   determining a skew angle and an axis of rotation associated with the received image and a desired rotation angle; and
   applying a deskewing affine transform according to the determined skew angle and axis of rotation.

6. The method of claim 3 wherein applying the affine transform comprises:
   applying a scaling affine transform.

7. The method of claim 6 wherein applying the scaling affine transform comprises:
   determining one of: a magnification and a resolution conversion factor; and
   applying a scaling affine transform according to the determined magnification or resolution conversion factor.

8. An image processor comprising:
   an image data receiver that is operative to receive image data that includes small high contrast image elements including at least one of: halftone image structure and text;
   an image transformer that is operative to receive the image data that includes small high contrast image elements from the image data receiver and apply an image manipulating transform to the image data, thereby generating transformation output data; and
   an adaptive packing rendering module that is operative to apply an adaptive packing form of rank order error diffusion to the transform output data, thereby restoring compaction of the small high contrast image elements that may have been degraded due to the application of the image manipulating transform and generating manipulated image output data.

9. The image processor of claim 8 further comprising:
   an image transform selector that is operative to select an image manipulating transform for use by the image transformer, the selection being base on at least one of a detected aspect of the received image data, a known aspect of a selected output device and a manipulation requested by a user of the image processor.

10. The image processor of claim 9 further comprising:
    an image skew detector that is operative to detect a skew angle of an image and to report the detected skew angle to the image transform selector.

11. The image processor of claim 9 further comprising:
    a desired rotation determiner that is operative to determine a desired image rotation based on an input or action of the user of the image processor and to report the determined desired rotation to the image transform selector.

12. The image processor of claim 9 further comprising:
    a magnification determiner that is operative to determine a desired image magnification based on an input or action of the user of the image processor and to report the determined desired magnification to the image transform selector.

13. The image processor of claim 9 further comprising:
    a scale factor determiner that is operative to determine a an image scale factor based on at least one of a size and orientation of an input image associated with the input image data and at least one of a resolution of the selected output device and a selected orientation of the image to be rendered by the image output device, and to report the determined scale factor to the image transform selector.

14. The image processor of claim 8 wherein the image transformer is operative to apply least one of: a rotational affine transform and a scaling affine transform.

15. The image processor of claim 8 wherein the image data receiver is operative to receive image data including high addressability image data, the image date transformer is operative to apply an affine transform to the received high addressability image data and the adaptive packing rendering module is operative to apply rank order error diffusion to the transform output data and generate high addressability output data having a high degree of compaction.

16. A method for transforming halftone image data, the method comprising:

receiving the halftone image data;

applying an image manipulating affine transform to the image data, thereby generating transformation output data; and applying a form of rank order error diffusion to the transform output data to render the image, thereby providing a high degree of compaction of halftone structures and restoring contrast that may have otherwise been degraded due to the application of the image manipulating affine transform.

17. An image processor comprising:

an image data receiver that is operative to receive image data that includes small high contrast image elements;

an image transformer that is operative to receive the image data that includes small high contrast image elements from the image data receiver and apply an image manipulating transform to the image data, thereby generating transformation output data; and an adaptive packing rendering module that is operative to apply an adaptive packing form of error diffusion to the transform output data, thereby restoring compaction of the small high contrast image elements that may have been degraded due to the application of the image manipulating transform and generating manipulated image output data, wherein the image data receiver is operative to receive image data including high addressability image data, the image date transformer is operative to apply an affine transform to the received high addressability image data and the adaptive packing rendering module is operative to apply rank order error diffusion to the transform output data and generate high addressability output data having a high degree of compaction.

* * * * *